US009959524B2

(12) United States Patent
Challenger et al.

(10) Patent No.: US 9,959,524 B2
(45) Date of Patent: May 1, 2018

(54) GRAPHICAL MODELING OF POSITION HIERARCHIES

(71) Applicant: Oracle International Corporation, Redwood Shores, CA (US)

(72) Inventors: Julian Challenger, Reading (GB); Ute Bursian, Rimbach (GE)

(73) Assignee: Oracle International Corporation, Redwood Shores, CA (US)

( * ) Notice: Subject to any disclaimer, the term of this patent is extended or adjusted under 35 U.S.C. 154(b) by 658 days.

(21) Appl. No.: 14/603,286

(22) Filed: Jan. 22, 2015

(65) Prior Publication Data

US 2016/0217424 A1     Jul. 28, 2016

(51) Int. Cl.
*G06F 3/048*     (2013.01)
*G06Q 10/10*     (2012.01)
*G06Q 10/06*     (2012.01)

(52) U.S. Cl.
CPC ......... *G06Q 10/105* (2013.01); *G06Q 10/067* (2013.01); *G06Q 10/10* (2013.01)

(58) Field of Classification Search
CPC ............................... G06F 3/048; G06Q 10/10
See application file for complete search history.

(56) References Cited

U.S. PATENT DOCUMENTS

| 7,801,755 | B2 | 9/2010 | Doherty et al. |
| 8,571,906 | B2 | 10/2013 | Upadhyaya et al. |
| 2010/0250322 | A1 | 9/2010 | Norwood |
| 2010/0274620 | A1* | 10/2010 | Upadhyaya ............ G06Q 10/06 705/7.15 |
| 2011/0055755 | A1 | 3/2011 | Chen et al. |
| 2011/0055767 | A1* | 3/2011 | Chen ................ G06F 17/30873 715/841 |
| 2011/0055771 | A1 | 3/2011 | Chen et al. |

(Continued)

OTHER PUBLICATIONS

Oracle Cloud "Human Capital Management Release Readiness"; obtained at https://cloud.oracle.com/saasreadiness/hcm?readinessRID=1410815715058; 2 pages; Copyright 2015; downloaded via circa Dec. 4, 2014.

(Continued)

*Primary Examiner* — Andrea Leggett
(74) *Attorney, Agent, or Firm* — Trellis IP Law Group, PC

(57) ABSTRACT

A method and system for providing a graphical position hierarchy and associated data sets is described. The method includes receiving a graphical position hierarchy model, analyzing nodes of the position hierarchy model to discern branches and leafs thereof, associating incumbent information with the nodes, where the incumbent information pertains to resources such as employees, contracting services, consulting, and other data and attributes related to the position hierarchy model, and displaying the model to a user thereof. Nodes of a position hierarchy may include incumbents, or may be placeholder position nodes, with no incumbents, allowing the user to model the position hierarchy according to organization needs before associating or allocating resources thereto. The method provides options for users to analyze the effect of changes to the position hierarchy on organizational resource allocation and costs in order to assess, optimize, and monitor the impact of such changes on the organization.

20 Claims, 10 Drawing Sheets

(56) References Cited

U.S. PATENT DOCUMENTS

2011/0307413 A1 12/2011 Dutta et al.
2012/0053952 A1 3/2012 Upadhyaya et al.

OTHER PUBLICATIONS

Oracle Cloud "Human Capital Management Cloud"; Release Content Document, Release 8; Copyright 2014; 61 pages (e.g., 57) downloaded via circa May 21, 2014.
Oracle Cloud "Human Capital Management Cloud—What's New in Release 8"; 8 pages; Feb. 21, 2014.
Position Hierarchy in AX 2012; obtained at http://daxing2012.wordpress.com/2012/10/14/position-hierarchy-in-ax2012/; 10 pages; Oct. 14, 2012.
Organizational Plan in Workflows; obtained at http://wiki.scn.sap.com/wiki/display/ABAP/Organizational+Plan+in+Workflows; 8 pages; Aug. 18, 2010.
Organizational Hierarchy Systems; obtained http://www.temple.edu/hr/departments/compensation/OrganizationalHierarchySystems.htm; 1 page; downloaded via circa Sep. 23, 2014.
iHRIS Manage; obtained at http://www.ihris.org/ihris-suite/health-workforce-software/ihris-manage/; 5 pages; downloaded via circa Sep. 23, 2014.

\* cited by examiner

GRAPHICAL MODELING OF POSITION HIERARCHIES

CROSS REFERENCES TO RELATED APPLICATIONS

This application is related to the following applications, U.S. patent application Ser. No. 12/563,082, entitled "Methods and Systems for Displaying Group Relationships in a Graphical User Interface," filed on Sep. 18, 2009, Ser. No. 12/563,069, flied Sep. 18, 2009, entitled "Method and System for Providing User Interface Representing Organizational Hierarchy," and Ser. No. 12/815,799, filed on Jun. 15, 2010, entitled "Predicting the Impact of a Personnel Action on a Worker," which are hereby incorporated by reference, as if set forth in full in this specification:

BACKGROUND

Exemplary implementations are directed to a method and system for providing a graphical user interface to model a position hierarchy representing organization hierarchy in terms of user defined positions having associated incumbent resource allocations, wherein nodes of the position hierarchy may be displayed as a graphical hierarchical model for user manipulation thereof.

Conventional data modeling schemas such as relationship models, hierarchy models, network models, and the like, are commonly used to display hierarchical relationships among data records. Typically, database software is employed to organize and manage such data records from a database. For example, human resource departments often use database software to manage employee records, generate reporting data, such as organizational charts, and to help manage business information such as headcount, position vacancies, and the like.

Unfortunately, convention systems and software generally require users to gather and manipulate data from a variety of sources. For example, to manage an employment organizational hierarchy chart, users are often forced to manually change the organizational chart as employees move between employment positions. The issue is further exacerbated when the systems employed are text based, requiring the user to spend inordinate amounts of effort to update organizational hierarchy charts.

Some systems have attempted to solve the above using Graphical User Interfaces (GUIs), which have become a useful way for modeling and displaying hierarchical relationships for business needs, such as displaying organizational charts. Unfortunately, such conventional graphical user interface modeling tools generally require that the user make manual changes to multiple data sets when employees are added, moved, or deleted, for example when employees are hired, promoted, or leave the organization.

Therefore, a new an improved graphical user interface and hierarchical data processing system is desired to overcome the above.

SUMMARY

A system and method for graphically modeling and maintaining a position hierarchy and associated data sets is described. The method includes using a graphical modeling software engine, user graphical interface, and associated nodal analysis tools to receive, create, configure, and display a graphical position hierarchy model, including nodes and incumbents associated with the nodes, for user graphical manipulation thereof. The nodes of the position hierarchy model may be analyzed in order to discern the branches and leaf thereof and determine the hierarchical relationships therebetween.

Users may utilize the method and system to quickly and efficiently graphically model a position hierarchy using a graphical interface designed to, for example, facilitate a user in ordering, creating, deleting, and editing employee assignments pertaining to positions associated with a business organization. Nodes of the position hierarchy, herein referred to as "position nodes," may include incumbent resource allocations, or may be used as placeholder position nodes, configured with no incumbent resource allocations, to allow the user to construct, configure, and adjust the position hierarchy according to business needs without relying on allocating available resources. Such incumbent information associated with the nodes of the position hierarchy pertains to resources such as workers, employees, contracting services, consulting, and other resources related to the positions included in the position hierarchy.

The method further provides user options to analyze the effect of changes to the position hierarchy on organizational resource allocation, position occupancy, changes by the type of change, and changes to organizational costs in order to assess the impact of such changes on the organization. Such analysis may be used to assess changes before the changes are implemented by an organization.

The method and system may be configured to enable a user to analyze changes to the position hierarchy model with respect to a variety of incumbent attributes in order to predict and model the impact of such changes on the likelihood of attrition and future performance for incumbents, before such changes are implemented by the organization.

In addition, the method and system may be configured to allow a user to run a plurality of position hierarchy configuration scenarios in order to optimize the position hierarchy and associated data sets. Such optimization scenarios may be used to optimize for example, resource allocation, organizational costs, business process efficiency, and the like.

A further understanding of the nature and the advantages of particular embodiments disclosed herein may be realized by reference of the remaining portions of the specification and the attached drawings.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

FIG. 3 is a block diagram of a graphical user interface used for graphical modeling of position hierarchies.

FIG. 4A is a block diagram of a graphical user interface used for creating and adding position nodes to position hierarchies.

DETAILED DESCRIPTION

In the following description, numerous specific details are set forth to provide a more thorough description of the specific examples described herein. It should be apparent, however, to one skilled in the art, that one or more other examples and/or variations of these examples may be practiced without all the specific details given below. In other instances, well-known features have not been described in detail so as not to obscure the description of the examples herein. For ease of illustration, the same number labels are used in different diagrams to refer to the same items; however, in alternative examples the items may be different.

A system and method for modeling and maintaining a position hierarchy and associated data sets is described. The system includes a graphical user interface designed to facilitate a user in quickly and efficiently modeling a position hierarchy of nodes for example by enabling the user to graphically update, change, and analyze nodes of a position hierarchy and associated data sets. More specifically, the graphical interface is configured to facilitate the user in modeling an organizational hierarchy by enabling the user to graphically order, create, delete, edit, and analyze employee assignments pertaining to positions associated with a business organization.

Positions, as described herein, may include any type of positions used in organizational hierarchies. For example, positions may include employment positions such as workers, employees, management positions, supervisory roles, job functions, and the like. Positions may also include other types of positions such as roles, functions, assets, and the like used in other organizational structures such as military organizations, government organizations, corporate structures, clubs, associations, and the like, that are generally organized in a hierarchy.

The method and system further include using a graphical modeling software engine, user graphical interface, and associated nodal analysis tools to receive, create, configure, analyze, and display a graphical position hierarchy model, including position nodes, and incumbent resources associated with such position nodes, for user graphical manipulation thereof.

As conventional tools simply reflect the state of the organization at a present moment in time, and generally do not allow a user to monitor or explore the effects of changes to the organization, the method and system includes the facility for data analysis in order to determine and predict the impact of the hierarchy model, and changes thereof, to an organization prior to implementation.

Figure 1:
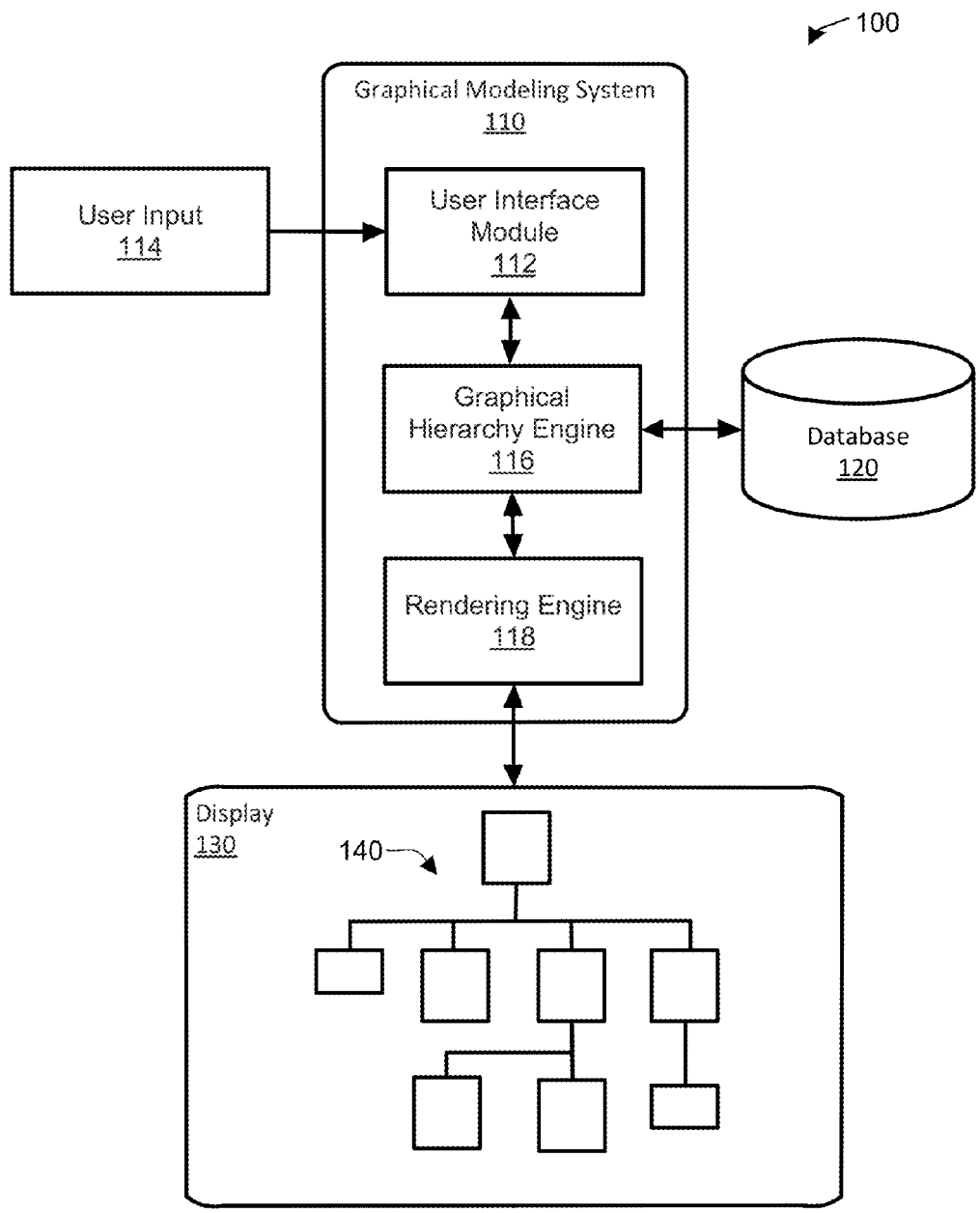
FIG. 1 is a block diagram of an exemplary computing system and graphical user interface used for graphical modeling and maintenance of position hierarchies displayed as graphical visualizations.

FIG. 1 is a block diagram of an exemplary computing system 100 for graphical modeling, maintaining, and analyzing position hierarchies. Computing system 100 may be any computing system, such as an enterprise computing environment, client-server system, and the like. System 100 includes graphic modeling system 110 configured to process data received from a user input 114 with regard to modeling, maintenance and analysis of a position hierarchy model 140, and associated data sets as described herein.

Note that the system 100 presents a particular example implementation, where computer code for implementing embodiments may be implemented, at least in part, on a server. However, embodiments are not limited thereto. For example, a client-side software application may implement graphic modeling system 110, or portions thereof, in accordance with the present teachings without requiring communications between the client-side software application and a server.

In one exemplary implementation, graphical modeling system 110 is connected to display 130 configured to display graphical position hierarchy model 140 to a user thereof. Display 130 may be a passive or an active display, adapted to allow a user to view and interact with graphical position data hierarchy 140 displayed thereon, via user input 114. In other configurations, display 130 may be a touch screen display responsive to touches, gestures, swipes, and the like for use in interacting with and manipulating position data hierarchy 140 by a user thereof. Gestures may include single gestures, multi-touch gestures, and other combinations of gestures and user inputs adapted to allow a user to model, generate, and maintain position data hierarchy 140.

In other implementations, system 100 may include database 120. Database 120 may be connected to the graphical modeling system 110 directly or indirectly and may be implemented as a non-transitory data structure stored on a local memory device, such as a hard drive, Solid State Drive (SSD), flash memory, and the like, or may be stored as a part of a Cloud network, as further described herein.

Graphical modeling system 110 may include user interface module 112, graphical hierarchy engine 116, and rendering engine 118. User interface module 112 may be configured to receive and process data signals and information received from user interface 114. For example, user interface module 112 may be adapted to receive and process data from user input associated with modeling, maintaining, and graphically updating position hierarchy model 140 for processing by graphical modeling system 110.

In an exemplary implementation, graphical hierarchy engine 116 may be adapted to receive data from user interface 114 and/or database 120 for processing thereof. In one configuration, graphical hierarchy engine 116 is a software engine configured to receive and process input data from a user thereof pertaining to position hierarchy model 140 from user interface module 114 and/or database 120 in order to generate, graphically model, maintain, analyze, and embellish position hierarchy model 140.

Graphical hierarchy engine 116 in other implementations may be configured as a data analysis tool to perform nodal analysis of data sets associated with graphical position hierarchy model 140. Such nodal analysis may include analysis functions such as interpreting such data sets by traversing graphical position hierarchy model 140 to determine position node locations and the hierarchical relationship between the position nodes. For example, graphical hierarchy engine 116 may traverse a data set of graphical position hierarchy model 140 to determine the parent and sibling position nodes defining branches and leaves of graphical position hierarchy model 140.

Graphical hierarchy engine 116 may receive existing data sets from database 120 for processing thereof. Such data sets may include a plurality of data sets such as position hierarchy data, data related to organization of positions, and data related to incumbents such as employee positions, worker assignments, and the like, associated with position hierarchy model 140.

Such processing of existing data sets may include editing the data sets to accommodate a user input received via user input 114 to add, delete, move a position node, and/or update the contents of position nodes associated with graphical position hierarchy model 140. For example, graphical hierarchy engine may receive a user input to make changes to graphical position hierarchy model 140 such as moving a position node from one branch of graphical position hierarchy model 140 to another branch, adding a new branch by adding a position node, deleting a branch by deleting a position node, update incumbent information, and the like.

Moreover, graphical hierarchy engine 116 may be adapted to automatically make changes and updates to position hierarchy model 140. For example, consider the case where a user moves (e.g., drags and drops) one position node to another branch. Graphical hierarchy engine 116 may be configured to automatically reroute nodal connections to preserve a modeled hierarchy of position hierarchy model 140. Such an automatic rerouting of position nodes provides the user the option to make changes to position hierarchy model 140 in a manner that preserves the graphical representation of position hierarchy model 140 relative to the amount of changes required. For example, for an addition of a node to a branch, to preserve a majority of a hierarchical structure of position hierarchy model 140, graphical hierarchy engine 116 may only change the hierarchical order of the affected branch, while not disturbing other branches of the position hierarchy model 140.

In an alternative implementation, graphical hierarchy engine 116 may be used as an analytical tool to assess and provide feedback to a user as changes to position hierarchy model 140 are modeled before such changes are actually implemented. For example, as described herein, a user may model changes to position hierarchy model 140 and receive feedback in the form of visual indication or reports as to the impact the changes to position hierarchy model 140 are having on occupancy of positions, headcount, types of changes made, costs to the organization, predictive effectiveness of the model, and the like, before the changes are actually implemented by the organization.

As described herein, graphical hierarchy engine 116 may be adapted as a data simulation tool to allow a user to model a plurality of scenarios pertaining to position hierarchy model 140 before such changes are implemented. Such scenarios may be run recursively in a manner to optimize one or more aspects of position hierarchy model 140. In an example, position hierarchy model 140 graphical hierarchy engine 116 may optimize occupancy while de-optimize other areas such as cost to the organization. Advantageously, such ability to run configuration scenarios on position hierarchy model 140 can allow organizations to deploy a workforce for differing organization needs. For example, a hospital human resource department may configure graphical hierarchy engine 116 to optimize position hierarchy model 140 for additional headcount during times of emergency, and then re-run scenarios for situations were cost savings are optimized.

In addition, graphical hierarchy engine 116 may be used as an analytical tool to predict effectiveness of the model to a user, as changes to position hierarchy model 140 are modeled. For example, as described herein, as a user makes changes to position hierarchy model 140, graphical hierarchy engine 116 may be used to analyze a plurality of attributes associated with incumbents associated with position hierarchy model 140 to assess and/or provide a prediction of the impact such changes modeled by the user would have on associated incumbents once the model is implemented by an organization. Such analysis may be used, for example, to identify a pattern to predict future performance or likelihood of attrition for such incumbents.

Advantageously, exemplar implementations of graphical hierarchy engine 116 allow a user to model, investigate, simulate, and assess the effect of changes to position hierarchy model 140 on the organization before any changes are actually implemented. Thus, such predictive modeling may be used to help an organization plan and organize their organizational structures without impacting the operation of the organization until such time the organization implements a model.

Rendering engine 118 is configured to receive position hierarchy model 140, associated data sets, and other data associated with position hierarchy model 140 such as graphical images, user pointing device signals, and the like, used to render position hierarchy model 140 on display 130. In one exemplary implementation, rendering engine 118 may be configured render 2D and 3D graphical models and simulations to allow a user to obtain more information about position hierarchy model 140. In one example, upon receiving instruction from rendering engine 118, rendering engine 118 may be configured to generate a display of interactive changes being made to position hierarchy model 140 by a user thereof.

Figure 2A:
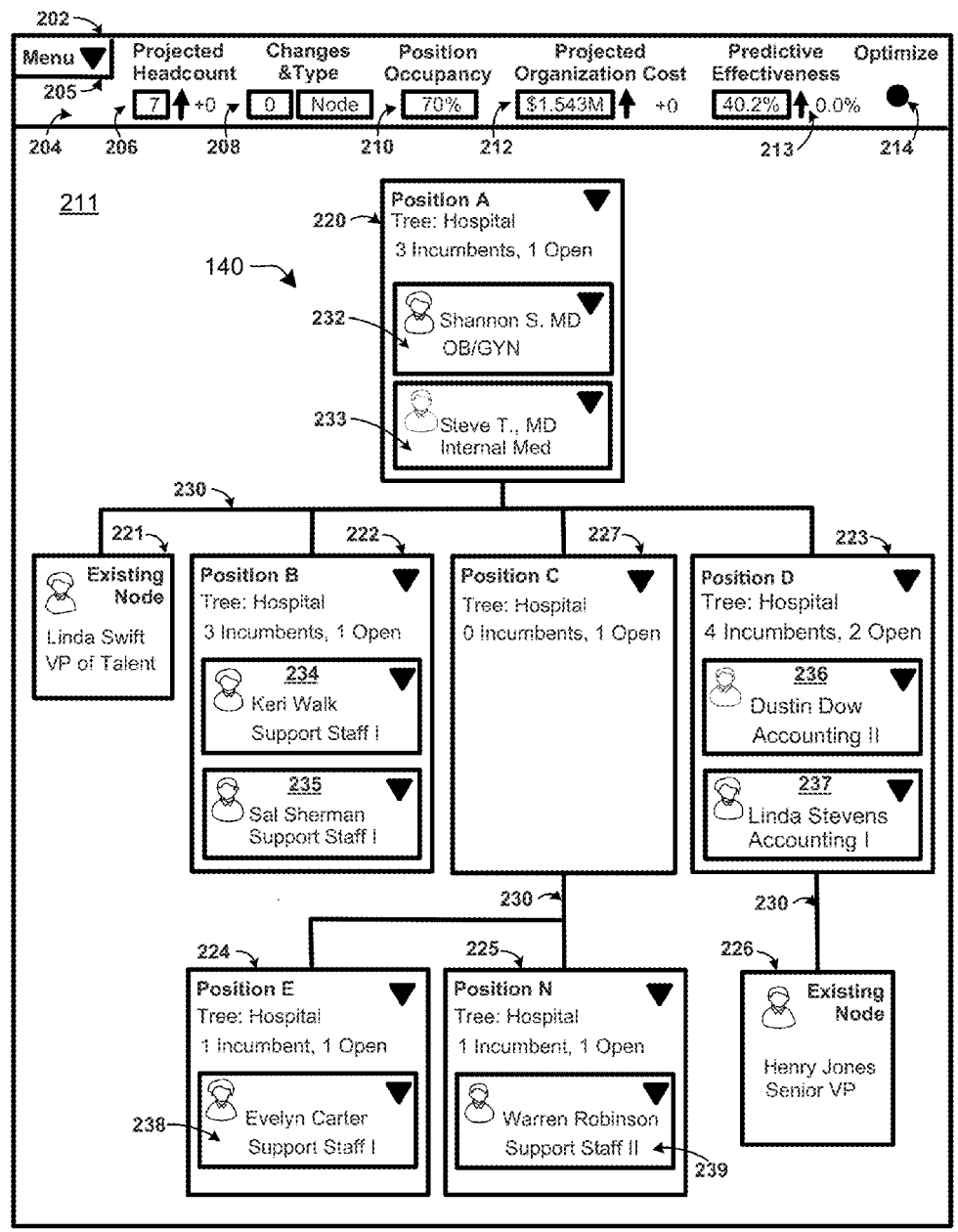
FIG. 2A is a block diagram of an exemplary user interface used for graphical modeling and maintenance of position hierarchies displayed as a graphical visualization in a first modeling state.
Figure 2B:
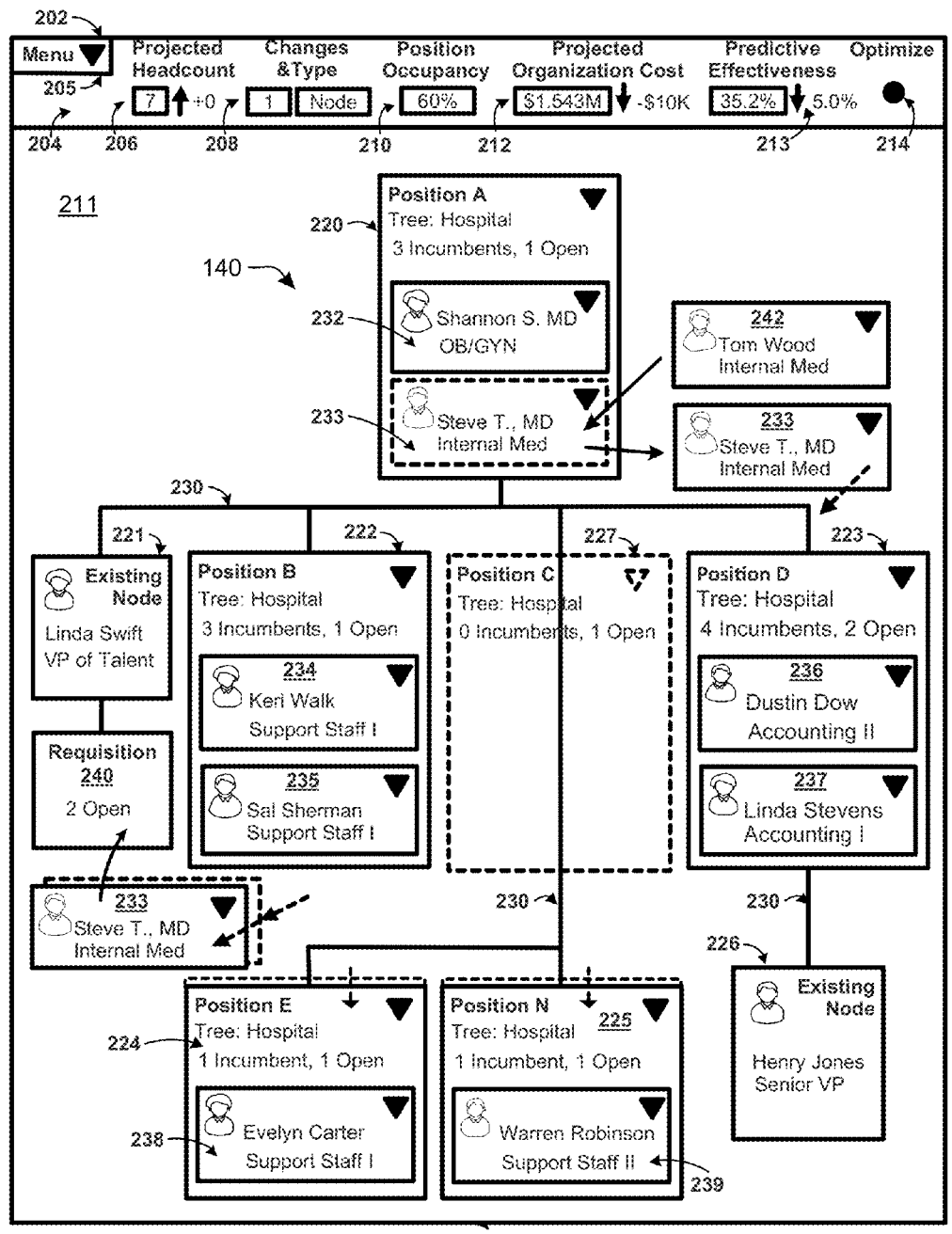
FIG. 2B is a block diagram of an exemplary user interface used for graphical modeling and maintenance of position hierarchies displayed as the graphical visualization in a second modeling state.
Figure 2C:
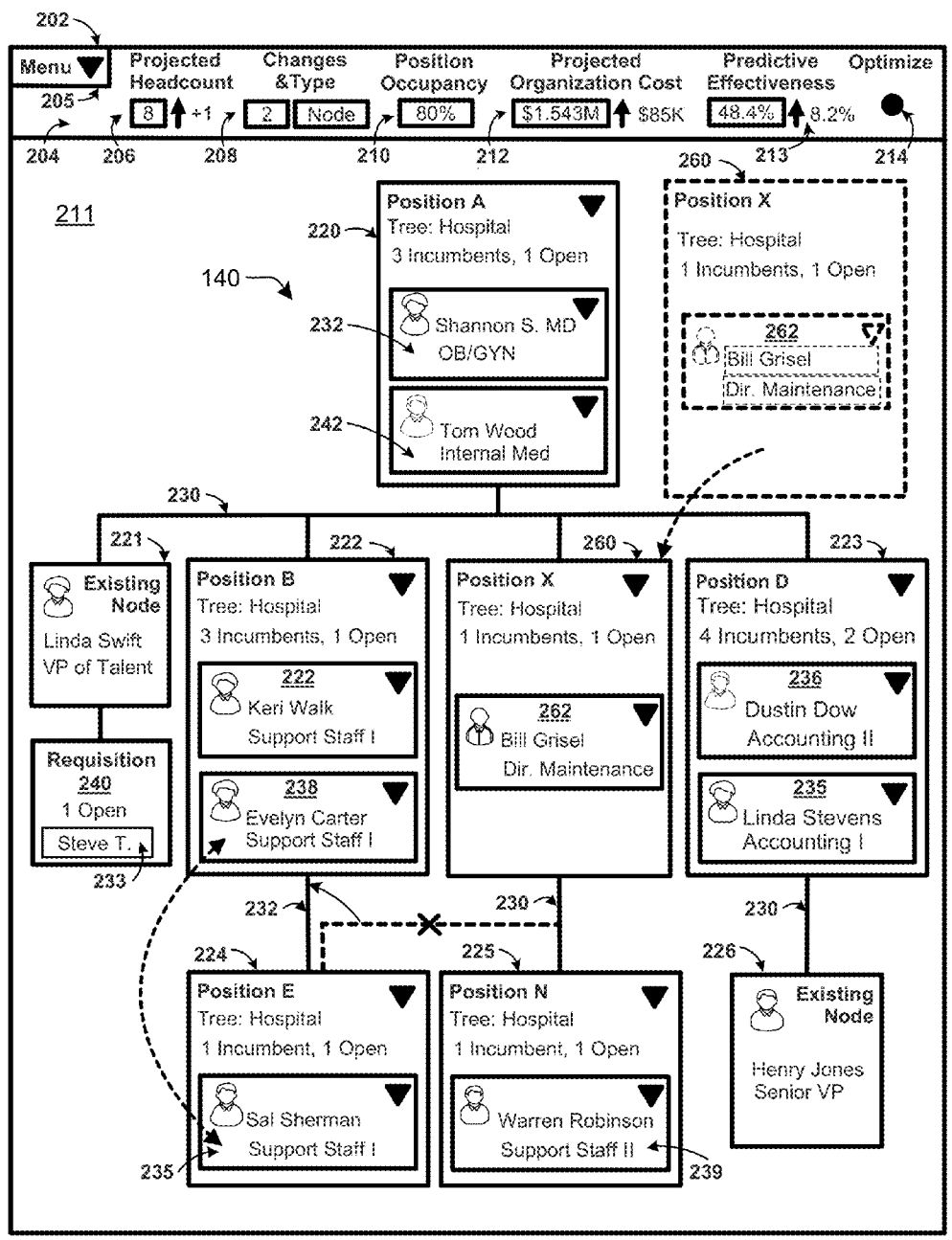
FIG. 2C is a block diagram of an exemplary user interface used for graphical modeling and maintenance of position hierarchies displayed as the graphical visualization in a third modeling state.

FIGS. 2A-C are exemplary block diagrams of graphical user interface 202 used for graphical modeling and maintenance of position hierarchies, such as position hierarchy model 140, displayed as a graphical visualization in various states of modeling and updating. Such position hierarchy model 140 may be the result of model creation or manipulation of existing data sets received from, for example, database 120.

FIG. 2A is an illustration of position hierarchy model 140 in a first state. Graphical user interface 202 includes toolbar 204 positioned adjacent to a graphical model display region 211. As described herein, toolbar 204 is configured to provide tools to a user for modeling, maintenance, updating, simulating, prediction, and analyzing position hierarchy model 140. Such graphical tools and position hierarchy model 140 may be reflected in data sets, stored for example, in database 120.

For example, toolbar 204 may include a menu button 205 adapted with features and options configured to allow a user to graphically model, edit, and embellish position hierarchy models 140, created as new models, or stored, for example, in database 120. In addition, toolbar 204 may include indicators and tools, such as data mining tools, analysis tools, and the like, to analyze the impact changes to position hierarchy model 140 have on organizational resources such as occupancy, types of incumbent changes made, headcount, and assess other organization considerations, such as organizational costs.

In an exemplary implementation, position hierarchy model 140 is illustrated graphically displayed in display region 211. In this example illustration, a user graphically models position hierarchy model 140 to include position nodes 220-227 connected by links 230. Position nodes 220-227 and links 230 graphically form a hierarchical tree data set having branches and leaf nodes. When modeled, such position hierarchy model 140 may be stored as one or more data sets in database 120 for later retrieval by a user thereof. In other implementations, loading and/or modifying data sets retrieved, for example, from database 120 may be used in creating and modeling position hierarchy models, such as position hierarchy model 140.

In one exemplary illustration, position hierarchy model 140 may be modeled as a new data set, or created using one or more data sets associated with an existing position hierarchy model 140 retrieved from databases such as database 120. A user may use menu options as described herein, and/or by graphically dragging and dropping position nodes, such as position nodes 220-227, to author model position hierarchy model 140. For example, a user may drag and drop position nodes 220-227 around the position hierarchy model 140 according to business needs. In addition, as described further herein, incumbents (e.g. worker assignments) may be dragged and dropped between position nodes 220-227.

In one implementation, a user models position nodes 220-227 to include data such as, a name of the hierarchical tree the position node is associated with, numbers of incumbents, numbers of open incumbent resources for the position, personnel attributes, and other data pertaining to resources associated with position nodes 220-227. Such resource data may be graphically configured by a user to define the capacity for each node. For example, resource allocation may be used to set the number of incumbents required for position nodes with respect to the needs of the business or organization.

Incumbent resources may be configured by the user to maintain the occupancy of a particular position independent of the hierarchy of the position relative to position hierarchy model 140. In this scenario, setting a higher number of incumbent resources allows the organization to strategically plan for resource needs of the position, as some positions require more or less resource allocations. Advantageously, modeling position hierarchies in this manner allows a user to graphically define and model position nodes of a hierarchy, such as illustrated by position hierarchy model 140, independent from the resources of the organization, thereby allowing user flexibility in creating and maintaining a hierarchical organizational structure.

In one exemplary implementation, position node 220 is configured as a parent node labeled "Position A," representing a parent position in position hierarchy model 140 which is connected to other position nodes 221-227 of position hierarchy model 140 via links 230. Position node 220 includes a configuration for three incumbent resources. For example, position node 220 is configured with three incumbent resources assigned thereto, with two of the incumbent resources incumbent resource 232 and incumbent resource 233 having assigned resources. In this illustration, incumbent resource 232 is filled by "Shannon S., MD" 232, who has the label attribute of "OB/GYN," and incumbent 233 who is filled by "Steven T., MD" having the label attribute of "Internal medicine." As two of the three incumbent resources are filled, position node 220 includes one "open" incumbent resource.

Accordingly, position nodes 220-227 include various incumbent resources that may be graphically modeled by a user. For example, position node 221 includes a single incumbent position filled by one resource, "Linda Swift" labeled as the "VP of Talent," which is connected to position node 220 via links 230. In this implementation, position node 221 is defined as a child node connected to position node 220 via links 230.

Position node 222 is defined for a "Position B" representing a child position in position hierarchy model 140. Position node 222 may be connected to other position nodes 220-221, and 223-227 of position hierarchy model 140 via links 230. In this illustration, position node 222 is configured to accept three incumbent resources, with two of the incumbent resources incumbent resource 234 and incumbent resource 235 having assigned resources, where incumbent resource 234 is filled by "Keri Walk," who has the label attribute of "Support Staff I," and incumbent resource 235 is filled by "Sal Sherman" having the label attribute of "Support Staff I." As two of the three incumbent resources are filled, position node 222 includes an "open" incumbent resource.

To maintain the hierarchical structure of position hierarchy model 140, position node 227 may be a placeholder node defined as a "Position C" representing a child position in position hierarchy model 140. In this scenario, position node 227 has been assigned one incumbent resource that has not been filled, leaving one "open" resource. Such placeholder position nodes may be added, moved, or deleted without disturbing, or minimally disturbing, the underlying position hierarchy model 140. As described further herein, links 230 automatically reroute as position nodes are moved, added, deleted, etc.

Position node 223, defined as "Position D," is illustrated coupled via links 230 to position node 220 and position node 226, forming a branch of position hierarchy model 140, where position node 220 is the parent node of the branch, position node 223 is a child node to position node 220, and position node 226 is a child node of position node 223. In this illustration, position node 223 is configured to accept four incumbent resources, with two of the incumbent resources incumbent resource 236 and incumbent resource 237 having assigned resources. As two of the four incumbent resources are filled, position node 223 includes two "open" incumbent resources.

Position nodes, such as position node 223 may be allocated different levels of resources having different skillsets, education, experience, and the like, for the same position. For example, since people having a plurality of different skills may handle a position, incumbents may be used to specify resources having levels of skill suitable to handle the position. As illustrated, consider the case for position node 223 where "Position D" is defined for an "Accounting Function," configured with four incumbents and two "open" incumbent allocations. Such an accounting function may be defined by a user to be filled by incumbent resources having various levels of accounting skills, such as "Accounting I, Accounting II, and the like. For example, as illustrated incumbent resource 236 is filed by "Dustin Dow" having the label attributes of "Accounting II," and incumbent resource 237 is occupied by "Linda Stevens" having an attribute label of "Accounting I." Thus, either "Dustin Dow" or Linda Stevens" would be suitable for the position. Advantageously, providing the user with flexibility to define resource allocation to fill a position provides flexibility in allocating organizational resources toward business needs rather than only by title, functional role, specific skillsets, and the like.

Position node 226 includes one resource "Henry Jones" titled as "Senior VP." Position node 226 may be used as other single position nodes having only one incumbent to define individual positions that are critical or unique to the organization structure. Alternatively, such individual position nodes may be used similarly to placeholder position nodes, but with a fixed defined resource, thereby allowing users to maintain, lockdown, or identify key individual resources, when modeling position hierarchy model 140. Such position node 226 may be created, or, as illustrated, may be an existing node retrieved from a database such as database 120.

As described herein, position nodes 224 and 225 are connected to position node 220 and position node 227 via links 230. Such arrangement illustrates that position nodes 224 and 225 are child nodes of both position node 220 and position node 227 defining a branch of position hierarchy model 140. Position node 224 is labeled as "Position E" having two incumbent resource allocations. One of the two resource allocations are filled by "Evelyn Carter" having the label attribute of "Support Staff I," thereby leaving one "open" incumbent resource to be filled. Position node 225 is labeled as "Position N", representing that position hierarchy model 140 may have an "N" number of positions. In this example, position nodes 230 includes an allocation for two incumbents with one of the two resource allocations filled by "Warren Robinson" having the label attribute of "Support Staff II," thereby leaving one "open" incumbent resource to be filled.

As described herein, the graphical modeling capability of system 100 includes a graphical user interface, such as toolbar 204, designed to provide a user graphical tools and functions for graphically modeling position hierarchy model 140. Illustratively, toolbar 204 includes a menu selection 205, "Projected Headcount" indicator 206 used to track headcount changes, "Changes & Type" indicator 208 used to track changes and types of changes made, "Position Occupancy" indicator 210 used to track position occupancy, "Projected Organizational Cost" indicator 212 used to track changes to organizational costs, and "Predictive Effectiveness" indicator 213, with respect to position hierarchy model 140 and changes thereto.

Illustratively, in response to analyzing the position nodes of position hierarchy model 140 in this first state, indicator 206 shows a "+0" change in headcount, indicator 208 shows a "0" change to the position nodes, indicator 210 shows a "70%" position occupancy, indicator 212 shows a cost of "$1,543,000" for the current resources, and indicator 213 shows a predictive effectiveness indication of "35.2%," as modeled in position hierarchy model 140. As described further below, changes to position hierarchy model 140 are reflected via indicators 206-213.

In one exemplary implementation, toolbar 204 includes a button 214 used to operate an optimization function. As described herein, such optimization function may be used to run a plurality of scenarios to optimize areas such as headcount, types of changes to the position hierarchy model 140, position occupancy, organizational costs, and combinations thereof in order to meet one or more organizational goals. For example, selecting button 214 may activate pop-up windows, dropdown menus, lists, and the like, in order to select optimization for one or more aspects of position hierarchy model 140 as described herein.

Advantageously, such optimization function allows a user to run scenarios for various business needs, without impacting position hierarchy model 140 until, for example, a scenario is selected for implementation by the organization. In other implementations, such optimization may be done automatically based on preset criteria and/or through recursive analysis. As such, a plurality of different scenarios and configurations of position hierarchy model 140 may be used to optimize position hierarchy model 140 according to an organizational plan. For example, during a construction project, such optimization may be used to optimize resource allocation over various phases of the construction project.

FIG. 2B is an illustration of position hierarchy model 140 in a second state. In this example illustration, graphical user interface 202 and toolbar 204 are used to graphically model changes to position hierarchy model 140. Illustratively, position node 227 is shown removed, position node 220 has been updated with a new incumbent resource, and incumbent resource 233 has been graphically moved out of position node 220 into display area 211 and disconnected from position hierarchy model 140. Such graphical changes may be reflected in data sets stored for example, in database 120.

In one exemplary illustration, position node 227 is removed, for example by using a mouse, touch, or other input from user input 114 to select and remove, e.g., right click a mouse function and "delete," position node 227 from position hierarchy model 140. Upon removal, as described herein, links 230 are automatically rerouted to connect position node 220 directly to position nodes 224 and 225. Such rerouting allows position hierarchy model 140 to remain intact, except for the restructuring of the branch of the hierarchy formed between position node 220, position node 227, and position nodes 224 and 225, which after the change consists of position nodes 220, 224, and 225.

In this illustration, requisition node 240 has been added to position hierarchy model 140, for example, by using toolbar menu 202 to create and attach such requisition node 240 to position node 221 via links 230. Such requisition node 240 may be used to quickly add incumbents to position hierarchy model 140 without specifying new position nodes and incumbent combinations. Requisition node 240 may be connected to the other position nodes of requisition node 240 via links 230. A user may graphically make such connection, for example, by using a mouse or other device to graphically select, drag, and position requisition node 240 to "touch" or "overlap" position node 221.

In other implementations, a user may use system 100 to graphically move, edit, and place incumbents within position hierarchy model 140. For example, FIG. 2B illustrates the change to incumbent resources associated with position node 220. As illustrated, position node 220 includes the graphical removal and replacement of incumbent resource 233 by another incumbent resource 242 created by a user, or obtained, for example, from a record in database 120. To replace incumbent resource 233, a user may use input device 114 to select and move (e.g. drag and drop) incumbent resource 233 from a graphical position within position node 224, into display region 211. A user then may use input device 114, as described herein, to move or "drag" incumbent resource 242 from display area 211 to the graphical position within position node 224 previously occupied by incumbent resource 233.

In addition, system 100 may be used to graphically move incumbent resources into and out of position nodes and display area 211. For example, FIG. 2B illustrates the graphical movement of incumbent resource 233 from display area 211 into requisition node 240 by a user thereof. Illustratively, position nodes 224 and 225 are shown moved on display area 211 to provide space for incumbent resource 233. Such illustrated movement of incumbent resource 233 out of position node 220 into display area 211, and then into requisition node 240 illustrates the ease and simplicity at which input device 114 and/or other inputs such as touches, gestures, and the like, may be used by a user to graphically move, adjust, create, and change the graphical association of incumbent resources to nodes of position hierarchy model 140.

At this second state, changes to the position nodes and incumbents may be reflected via indicators 206-213 while the user is modeling graphical changes to position hierarchy model 140. For example, removing position node 227 from position hierarchy model 140 is reflected as a change to one node as illustrated in indicator 208, indicating "1" "node," and a "10%" reduction of positions as illustrated in indicator 210, which in this second state indicates "60%" position occupancy.

In addition, indicator 212 may capture organizational costs of such modeling changes. For example, changes to the cost of the organization changes may be reflected in changes to organizational cost calculated for the first state position hierarchy model 140 as illustrated in FIG. 2A, relative to organizational costs calculated for state two of position hierarchy model 140, illustrated in FIG. 2B. Illustratively, such changes to position hierarchy model 140 between the first state and the second state is calculated by system 100 as cost reduction to the organization of "−$10,000," displayed as such in indicator 212, and a decrease in predicted effectiveness of "−5%" shown in indicator 213.

FIG. 2C is an illustration of position hierarchy model 140 in a third state. In this example illustration, graphical user interface 202 and toolbar 204 are used to directly model changes to position hierarchy model 140. Here, a user graphically models and moves position 260 from display area 211 into the hierarchical position previously held by position node 227, reconfigure the connection of position node 224 from position node 220 to position node 222, and swap incumbent positions 235 and 238 between position nodes 222 and 224.

In one exemplary illustration, position node 260, labeled as "Position X," may be created by a user, or retrieved, for example, from one more records stored in database 120. Illustratively, position node 260 includes two incumbent allocations one being occupied by incumbent resource 262 with resource "Bill Grisel" having an attribute label as "Dir. Maintenance," thereby leaving one "open" incumbent resource available.

Position node 260 is added to position hierarchy model 140, for example by using a mouse, touch, or other input from user input 114 to select and move position node 260 from display region 211 to position hierarchy model 140. Upon addition, as described herein, links 230 are automatically rerouted to connect position node 220 directly to position node 260, and from position node 260 to position nodes 224 and 225. Such rerouting allows position hierarchy model 140 to remain intact, except for the restructuring of the branch of the hierarchy formed between position node 224, the newly inserted position node 260, and position nodes 224 and 225, which after change would consist of position nodes 224, 260, 224, and 225. Thus, such graphical movement of position node 260 into the position previously held by position node 227 triggers links 230 to automatically reroute thereby revising a branch of position hierarchy model 140 using graphical motion. Such graphical changes are reflected in data sets, stored for example, in database 120.

In this illustrative third state, position hierarchy model 140 has two more positions than the previous second state, the addition of position node 260 and the creation position node 240, by adding incumbent resource 233, resulting in a 20% increase of positions, and an "$85K" in crease in cost. Such increase in positions may be illustrated in indicator 210 as "80%" position occupancy, two node changes as illustrated in indicator 208, indicating "2" "node," and an increase of "$85K" shown in indicator 212. In addition, since incumbent resource 262 was added, indictor 206 indicates an increase in headcount as "+1," which is an increase relative to the first and second states of position hierarchy model 140 illustrated in FIGS. 2A and 2B described herein. Thus, the headcount state as shown in indicator 206 changed by one in this illustration of the third state, when position node 260 was added having incumbent resource 262 containing an allocated resource.

A user may modify or form branches of position hierarchy model 140 by rerouting links 230 between nodes of position hierarchy model 140. Such rerouting may be done graphically using a mouse, touch, and the like. For example, as illustrated, the connection of link 230 between position node 224 and position nodes 225 and 220 may be severed by a user using a graphical "delete" or "reroute" function in order to form a new link 230 between position node 224 and position node 222. Illustratively, prior to the relocation of link 230, position node 220 and position node 222 formed a branch of position hierarchy model 140. With such rerouting, a modified branch is formed consisting of position node 220, position node 222, and position node 224.

In one exemplar implementation, system 100 may be configured to predict the effectiveness of the modeled changes to position hierarchy model 140. As discussed above, toolbar 204 includes "Predictive Effectiveness" indicator 213 used to display the effectiveness of position hierarchy model 140 when implemented by an organization. Such predicted effectiveness is a rating configured to reflect the impact of modeling position hierarchy model 140 on areas such as the future performance of the incumbents, or their likelihood of attrition. During modeling of position hierarchy model 140, changes to predicted effectiveness are displayed via indicator 213.

Such effectiveness prediction may be calculated, for example, using graphical hierarchy engine 116, configured as data mining tool to analyze a plurality of attributes related to incumbents. For example, such attributes may be related to an employee's background, job responsibilities, past performance, compensation, or any other relevant attributes. Exemplar techniques for analyzing such attributes are described in U.S. patent application Ser. No. 12/815,799, filed on Jun. 15, 2010, entitled "Predicting the Impact of a Personnel Action on a Worker," herein incorporated by reference for all purposes.

In addition to analyzing such incumbent attributes, system 100 may utilize graphical modeling engine 116 to analyze such attributes of incumbent resources in light of a hierarchical model represented by position hierarchy model 140. Illustratively, depending on which position nodes the incumbents are associated with, attributes of such incumbent resources may have more or less impact on the effectiveness of a given configuration of position hierarchy model 140. Thus, changes to position hierarchy model 140 that impact incumbents and their hierarchical position within hierarchy model 140, may impact the predictive effectiveness. For example, referring to FIGS. 2A-C, predictive effectiveness is illustrated in indicator 213 as changing from "40.2%" in FIG. 2A, to "35.2%" in FIG. 2B, and "48.4%" in FIG. 2C. At the second state in FIG. 2B, changing incumbent 233 with incumbent 242, removing position 227, adding requisition node 240, and moving incumbent 233 into requisition node 240 resulted in a predicted decrease of effectiveness of "5.0%" from the "40.2%" illustrated in FIG. 2A. In FIG. 2C, representing a third state, adding position node 260, rerouting link 230 to form a link 230 between position node 224 and 222, and swapping incumbents 235 and 238 resulted in a predicted increase of effectiveness of "8.2%" from the first state illustrated in FIG. 2A.

Thus, while the impact to effectiveness may be found by analyzing such attributes of incumbents separately, the addition of a hierarchical model allows a user to further analyze and predict the effectiveness of position hierarchy model 140 for by analyzing such attributes in light of changes to the hierarchical relationships between the incumbents defined by position hierarchy model 140.

Figure 3:
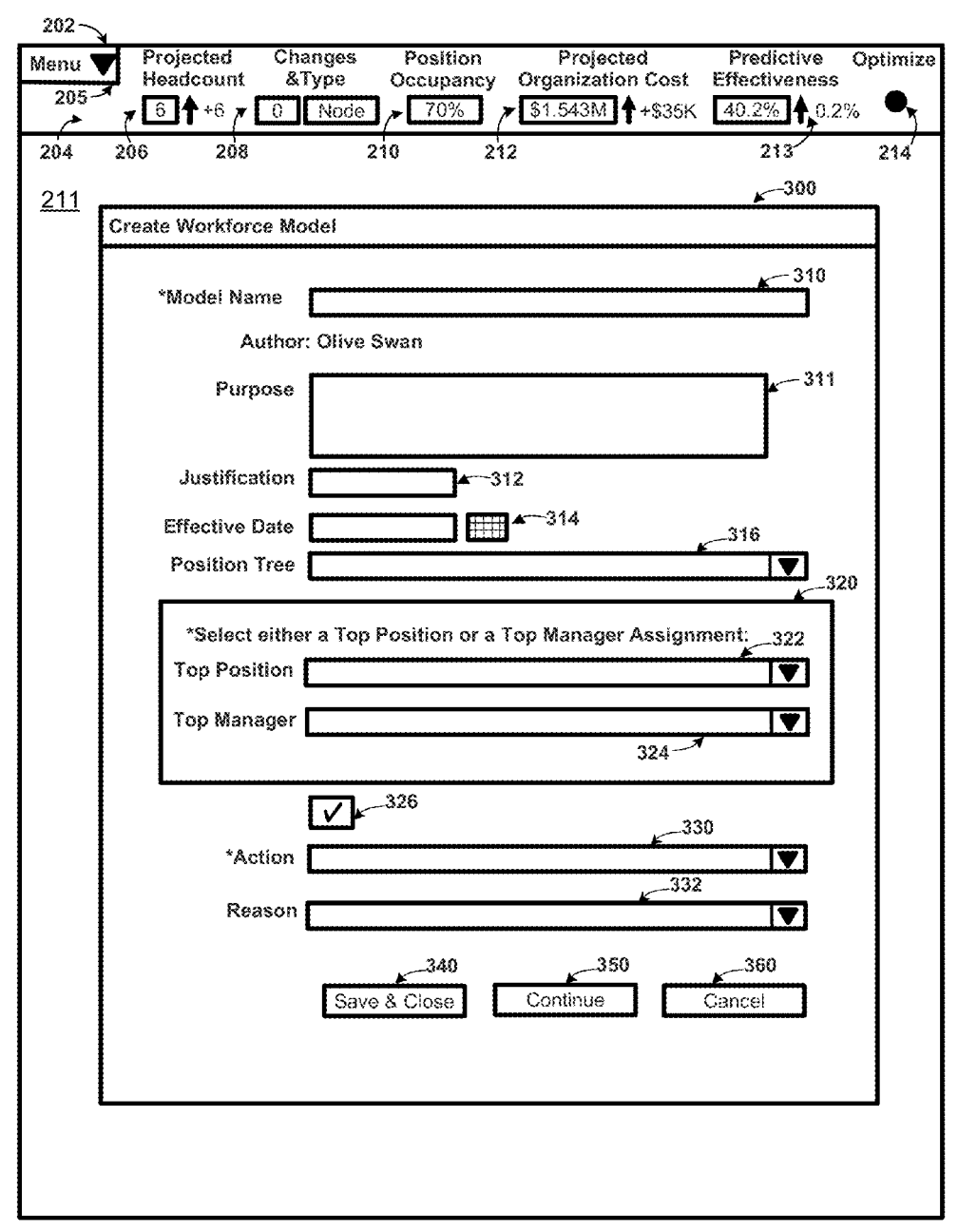

FIGS. 3, 4A, 4B, and 5 are exemplary block diagrams of a graphical user interface used for graphical modeling and editing of position nodes and position hierarchies, such as position hierarchy model 140. Illustratively, FIG. 3 shows a model creation interface 300 displayed on display area 211. Model interface 300 may be adapted to allow a user to create and/or edit position hierarchy model 140. In one exemplar illustration, model interface 300 includes a model name input 310, a purpose input 311, a justification input 312, effective date input 314, position tree selection 316, model association input 320, action selection 330, reason input 332, a save and close selection 340, continue selection 350, and a cancel selection 360.

Such inputs and sections are merely illustrative, and may be implemented in any suitable form such as dropdown menus, checkboxes, text commands, touches, gestures, and other inputs and signals that may be used to advantage, some of which are described herein.

Illustratively, model interface 300 may be activated by, for example, selecting menu selection 204. Model 300 once activated may be used to create position hierarchy model 140, for example, by a user inputting a name such as "Hospital" into model name input 310 and establishing an effective date using effective date input 314. Once created, or during the creation of position hierarchy model 140, a user may enter data and add attributes using model interface 300. For example, a purpose of position hierarchy model 140 may be entered into purpose input 311, a justification may be entered using justification input 312, cause an action to occur, such as select "Create New Model," using action selection input 330, input a reason for the position hierarchy model 140 by selecting a reason for position hierarchy model 140 in reason input 332, and so on.

In other implementations, the position of the tree may be defined using position tree input 316. Illustratively, upon selection of checkbox 326, a drop down menu may be used to allow the user to select the relative position of the position hierarchy model 140 into an existing tree, or define a new position hierarchy model 140. In addition, position assignment input 320 may be used to define the top position hierarchy model 140 with top position criteria using a position selection input 322, or by selecting a top manager using selection input 324. Creation and changes to the position hierarchy model 140 may be saved to database 120 for example, by selecting save and close selection 340 or continue selection 350. Creation or editing of position hierarchy model 140 may be cancelled by selecting cancel selection 360.

Figure 4A:
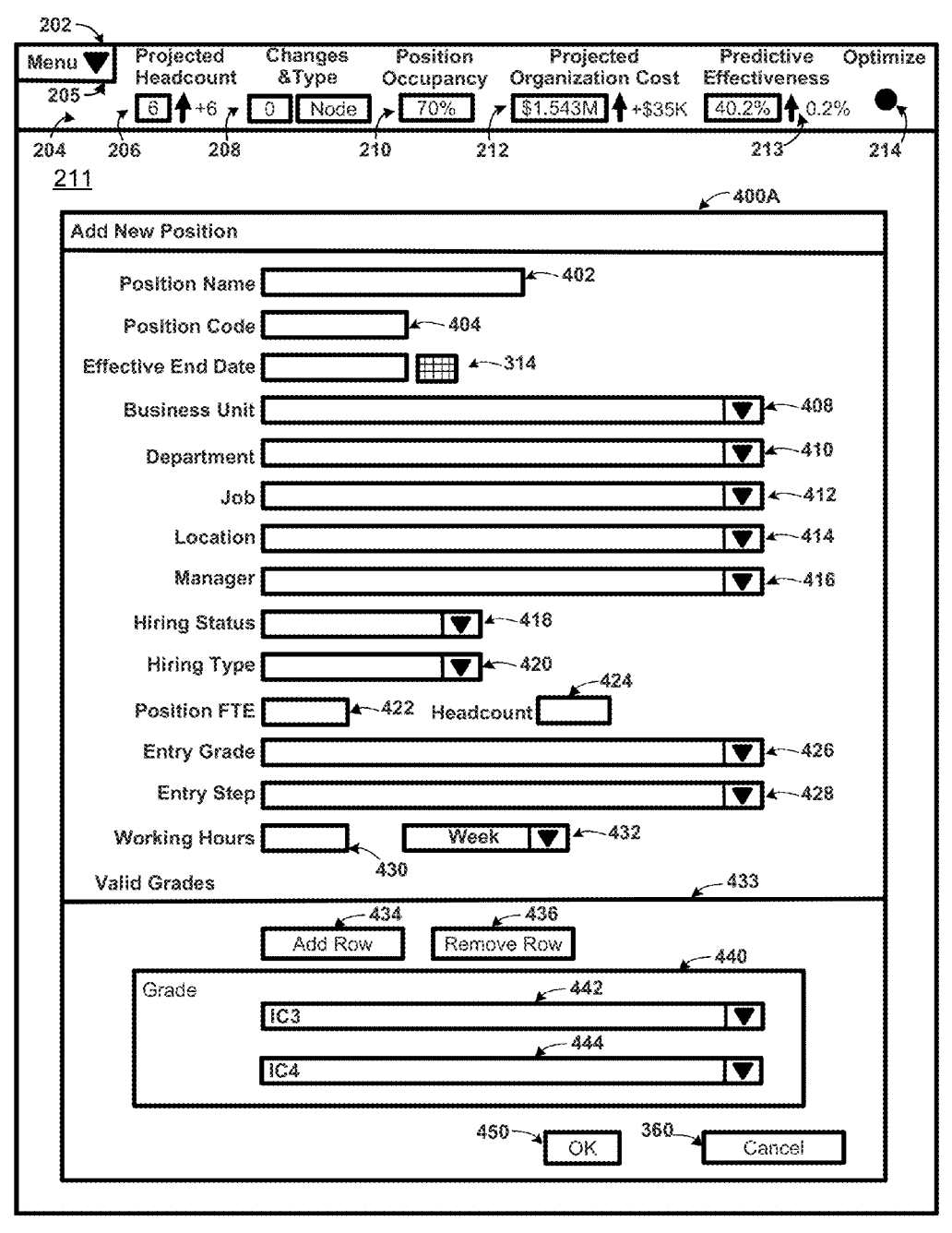

Illustratively, FIG. 4A shows a position creation interface 400A displayed on display area 211. Position creation interface 400A may be adapted to allow a user to create position nodes used with position hierarchy model 140. In one implementation, position creation interface includes position name input 402, position code input 404, effective date input 314, business unit selection input 408, department selection input 410, job selection input 412, location selection input 414, manager selection input 416, hiring status selection input 418, hiring type selection input 420, position FTE 422, headcount input 424, entry grade selection 426, entry step selection 428, working hours 430, week selection 428. Such inputs 402-432 allow a user to define attributes for position nodes, such as position nodes associated with position hierarchy model 40 as described herein.

In another implementation, position creation interface 400A may also include a valid grade selection 433. In this illustration, valid grade selection 433 may be used to define the grade level of resources that may be associated with incumbent resource assignments pertaining to a position being created. For example, valid grade selection may include a resource grade selector 440 used to set one or more resource grades for the position be created. Such grade selection, for example, may be done using grade selector 442 and grade selector 444. More or less grade selection may be implemented by selecting add row selection 434 or remove row selection 436. Alternatively, such grade selectors may be used to set a range of grade greater than one grade for those positions that may be occupied by a variety of resources and talents.

Figure 4B:
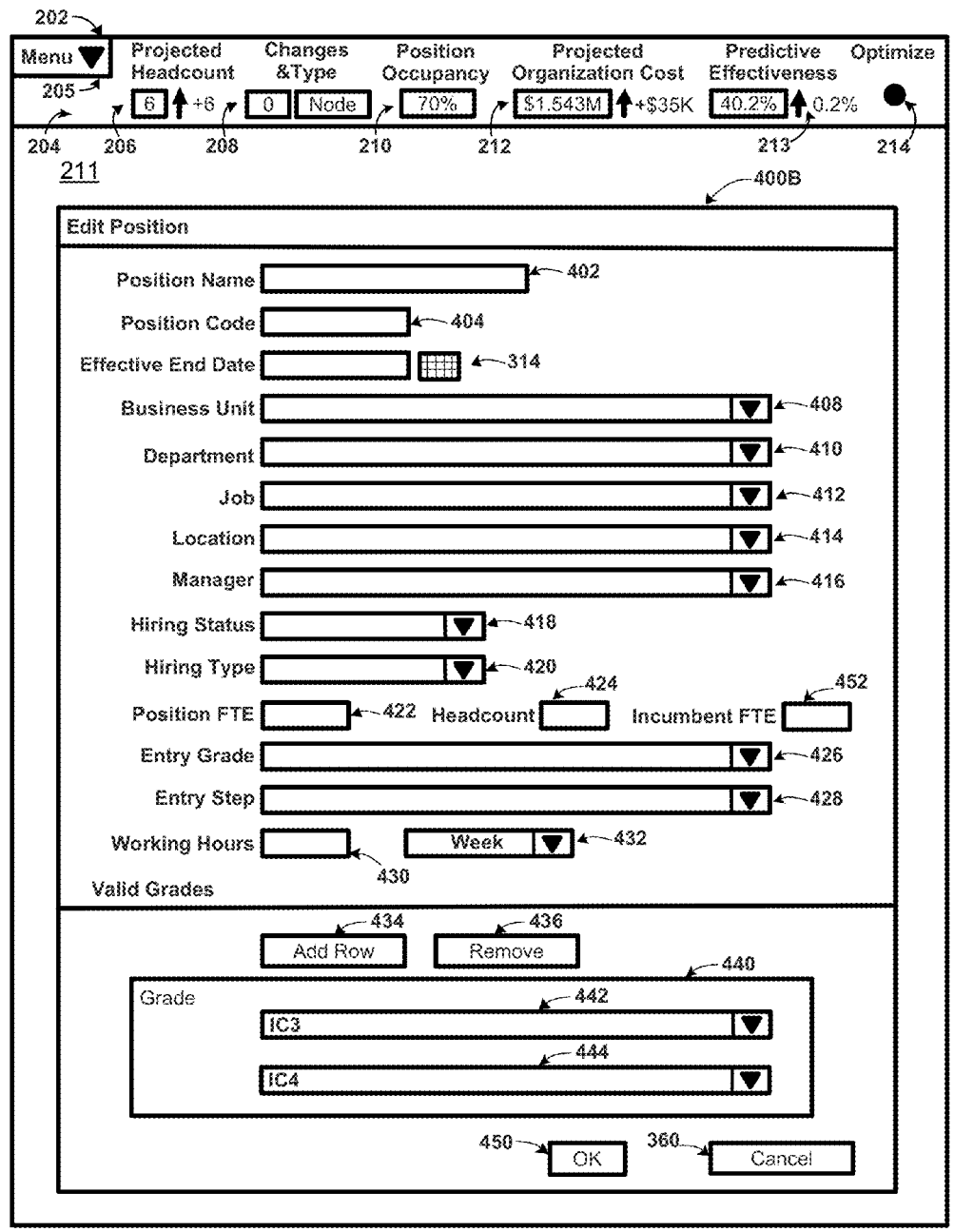
FIG. 4B is a block diagram of a graphical user interface used for editing of position nodes associated with position hierarchies.

FIG. 4B illustrates a position edit interface 400B displayed on display area 211. Position edit interface 400B may be adapted to allow a user to edit position nodes used with position hierarchy model 140. In one implementation, similar to position creation interface 400A, position creation interface includes position name input 402, position code input 404, effective date input 314, business unit selection input 408, department selection input 410, job selection input 412, location selection input 414, manager selection input 416, hiring status selection input 418, hiring type selection input 420, position FTE 422, headcount input 424, entry grade selection 426, entry step selection 428, working hours 430, week selection 428, and valid grade selection 433 as described herein. In addition, to the above inputs 402-433, position edit interface may include an incumbent FTE input 452. Such incumbent FTE input allows a user to define the position specifically for full time employment (FTE) attributes.

In one exemplary implementation, when a user loads position hierarchy model 140 or a position node thereof into system 100, such inputs 402-452 may be populated with data and attributes stored on database 120 for such existing position nodes. Such data may be then changed or edited by a user to reflect a new version of such position node being edited. For example, referring to FIG. 2C, such position edit interface 500 would allow a user to import position node 220 and update the incumbent resource 233 to incumbent resource 242.

Figure 5:
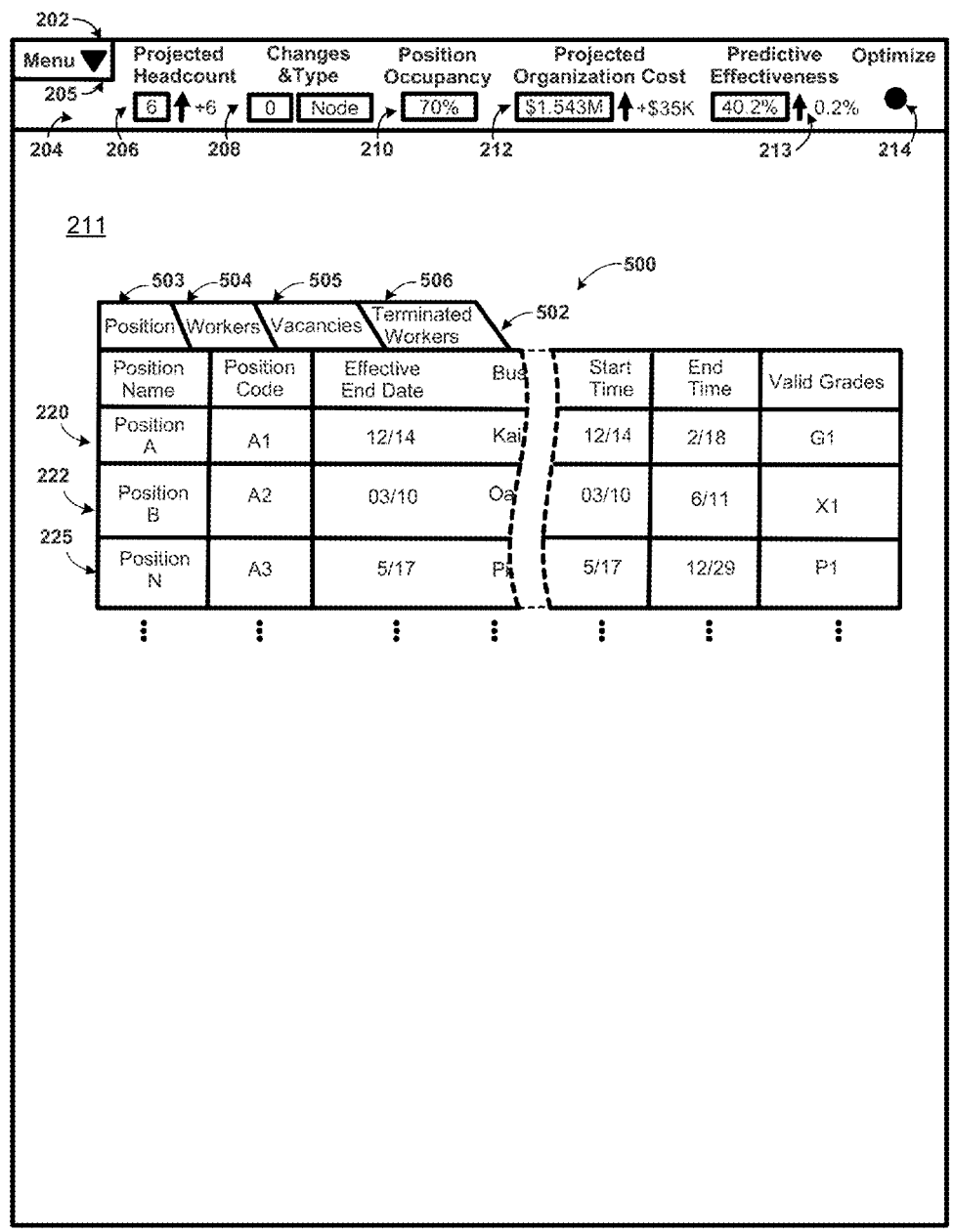
FIG. 5 is a block diagram of a graphical user interface used for editing of positions associated with position hierarchy models.

FIG. 5 illustrates a position interface 500 displayed on display area 211. Position interface 500 may be adapted to allow a user to edit hierarchical positions of position nodes associated with position hierarchy model 140. Illustratively, position interface 500 provides a user the options to set and adjust position location of position hierarchy model 140. Position interface 500 includes tab interface 502 that allows a user to navigate between position 503, workers 504, vacancies 505, and terminated workers 506 associated with position hierarchy model 140. For example, when the position tab 503 is selected, a user may add, view, or edit data pertaining to position nodes associated with position hierarchy model 140. As an example, position tab 503 is shown as selected such that data and attributes related one or more position nodes of position hierarchy model 140 are shown and accessible to a user thereof.

Illustratively, position nodes 220, 222, and 225 are listed in position interface 500 in tabular form. As such, a user may, change, add, delete, data associated with position hierarchy model 140 via editing entries listed in position interface 500. For example, consider the case where a user wants to swap positions between "Position A," position node 220, and "Position B," position node 222. Prior to switching positions, position node 220 has position "A1" and position node 222 has position "A2" reflective, for example, of position of position node 220 being in the first position of branch "A" and position node 222 having a position of "A2" indicative of position node 222 being in the same branch, but in a second position. In this scenario, a user may change the positions of the position node 220 and 222 by changing the respective position codes, e.g., the position code of "A1" for position node 220 would be changed to "A2" and the position code for position node 222 would be changed from "A2" to "A1, causing position nodes 220 and 222 to swap positions within position hierarchy model 140. Thus, in addition to graphically moving and editing position nodes using graphical editing tools found, for example, in toolbar 204, position interface 500 allows a user to use other techniques to establish, change, and update position nodes, data, and attributes such as shown in FIGS. 3, 4A, and 4B, associated with position hierarchy model 140.

Figure 6:
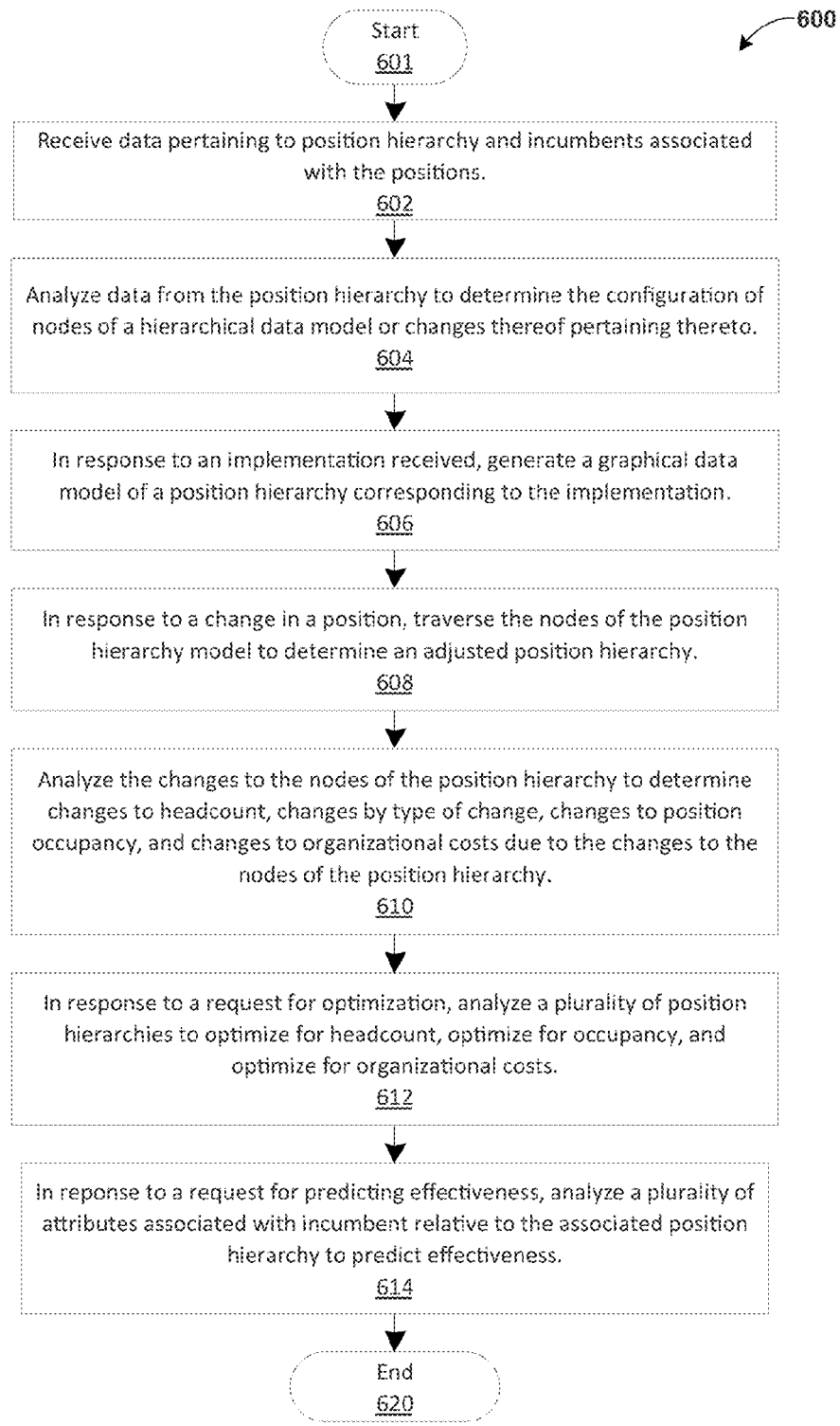
FIG. 6 is a flow diagram of an example method adapted for use with implementations, and variations thereof, illustrated in FIGS. 1-5.

FIG. 6 is a flow diagram of an example method 600 adapted for use with implementations, and variations thereof, illustrated in FIGS. 1-5. Method 600 may be entered into at 601, for example, by a user activating system 100 in order model position hierarchy model 140. At 602 data pertaining to position hierarchy model 140 is received. Such information may include data pertaining to incumbent allocations and incumbent resources assigned to one or more nodes of position hierarchy model 140. For example, to create position hierarchy model 140 a user using graphical interface 202 may enter the name "Hospital" into a pop-up window or other data entry point such as model name input 310, and apply an effective date using for example, effective date input 314 to establish a base position hierarchy model 140. Alternatively, a user may load an existing position hierarchy model 140 from database 120 or other data source for editing thereof.

At 604, position nodes, such as position nodes 220-227, and links, such as links 230, if any, are analyzed to determine the hierarchical structure of position hierarchy model 140. For a newly created model, a top position is established and used as the parent position node. As a user continues to model position hierarchy model 140, a data set of position hierarchy model 140 is created and updated according to a user specified implementation. A user specified implementation may a structured implementation pertaining to a specific business model and type, such as a shipping business, or may pertain to other implementations such as manufacturing, construction, healthcare, academics, governmental functions, etc.

At 606, in response to the user defined implementation, position hierarchy model 140 is generated on display 211 along with corresponding data sets, stored, for example in memory and/or database 120. In one exemplary implementation, a user may directly interact with position hierarchy model 140 using graphical tools and commands received for example via user input 114. Such commands may allow a user to add, delete, move, and change attributes to one or more position nodes of position hierarchy model 140.

Position hierarchy model 140 is traversed to determine the hierarchical data relationships. Such traversal may be done while a user is creating or updating position hierarchy model 140, or may be done at a later time. Changes to the data set are used to update position hierarchy model 140 and corresponding data set. In one implementation, highlighting is used to indicate the changes to position hierarchy model 140 such that a user may see feedback as position hierarchy model 140 is updated and displayed.

Upon or after updating position hierarchy model 140, changes are analyzed at 610 to determine and report the effects the changes have on headcount, occupancy, and organizational costs associated with position hierarchy model 140. In addition, such changes are also analyzed to determine and report the types of changes that were made to position hierarchy model 140.

At 612, in response to a request for optimization, method 600 analyzes a plurality of scenarios as described herein pertaining to different aspects of position hierarchy model 140 to optimize such aspects according to business needs. For example, a user may request a cost optimization for position hierarchy model 140 relative to an organizational budget. Method 600 may be used, for example, by graphical hierarchy engine 116 to recursively run optimization routines toward the end goal of optimizing costs toward such organizational budget.

At 614, in response to a request for predicting effectiveness as described herein, method 600 analyzes a plurality of attributes associated with incumbents with respect to a hierarchy represented by position hierarchy model 140 to determine the impact of the position nodes, model hierarchy, incumbent placements, and the like on the likelihood of attrition and future performance for incumbents, before such changes are implemented by the organization. For example, referring to FIGS. 2B and 2C, method 600 may analyze attributes of incumbents associated with position hierarchy model 140 to predict the likelihood of attrition and future performance for such incumbents upon removal of position node 227, addition of node 260, adding incumbent 233, adding requisition node 240, changing links 230, swapping incumbents 235 and 238, and the like.

Method 600 ends at 620, when for example, a user has finished graphically modeling position hierarchy model 140.

Figure 7:
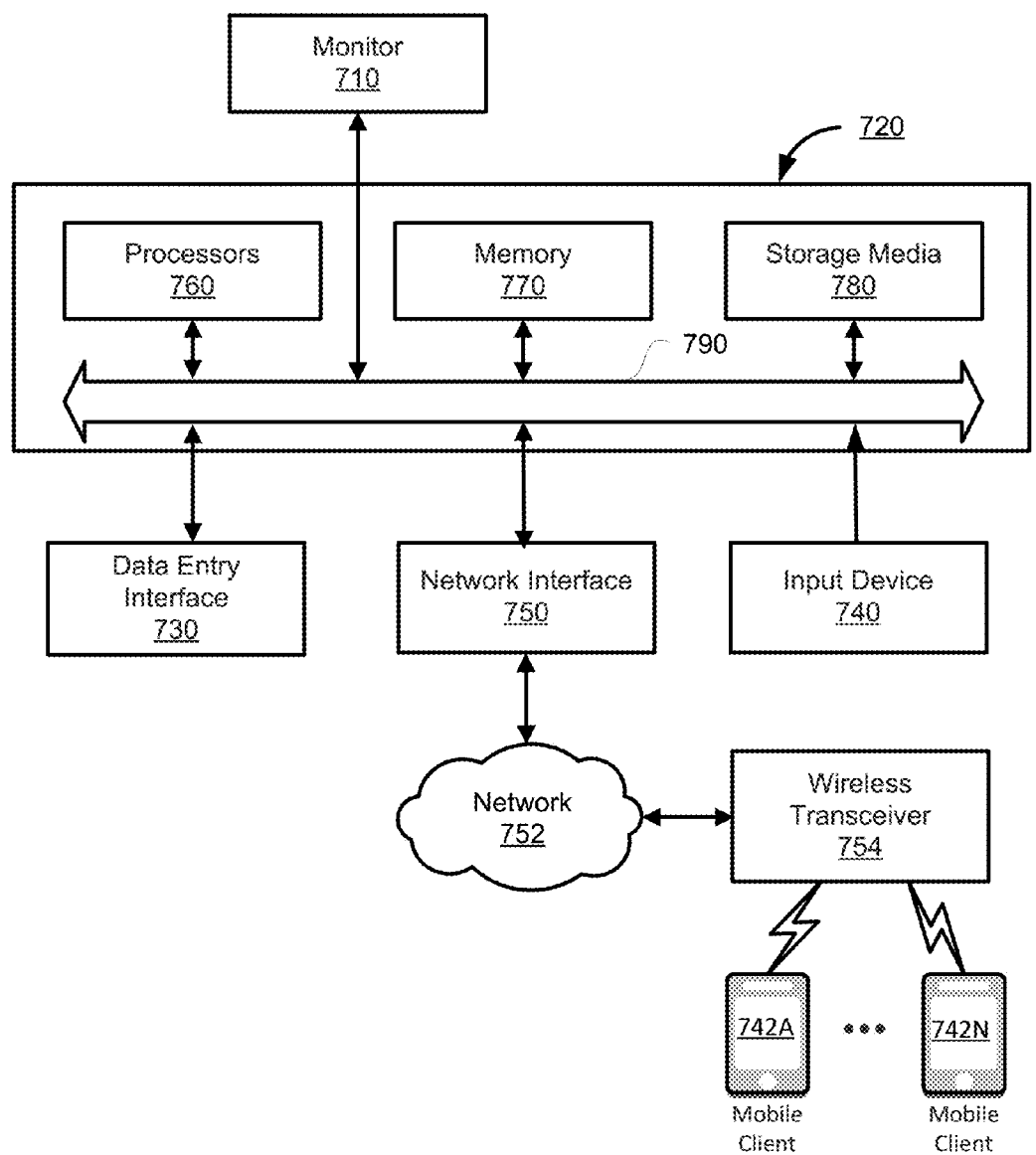
FIG. 7 is a block diagram of an exemplary computer and communication system.

FIG. 7 is a block diagram of an exemplary computer system 700 for use with implementations described in FIGS. 1-6. Computer system 700 is merely illustrative and not intended to limit the scope of the claims. One of ordinary skill in the art would recognize other variations, modifications, and alternatives. For example, computer system 700 may be implemented in a distributed client-server configuration having one or more client devices in communication with one or more server systems.

In one exemplary implementation, computer system 700 includes a display device 710 such as a monitor 710, computer 720, a data entry device 730 such as a keyboard, touch device, and the like, a user input device 740, a network communication interface 750, and the like. User input device 740 is typically embodied as a computer mouse, a trackball, a track pad, wireless remote, tablet, touch screen, and the like. Moreover, user input device 740 typically allows a user to select and operate objects, icons, text, characters, and the like that appear, for example, on the monitor 710.

Network interface 750 typically includes an Ethernet card, a modem (telephone, satellite, cable, ISDN), (asynchronous) digital subscriber line (DSL) unit, and the like. Further, network interface 750 may be physically integrated on the motherboard of computer 720, may be a software program, such as soft DSL, or the like.

Computer system 700 may also include software that enables communications over communication network 752 such as the HTTP, TCP/IP, RTP/RTSP, protocols, wireless application protocol (WAP), IEEE 802.11 protocols, and the like. In addition to and/or alternatively, other communications software and transfer protocols may also be used, for example IPX, UDP or the like.

Communication network 752 may include a local area network, a wide area network, a wireless network, an Intranet, the Internet, a private network, a public network, a switched network, or any other suitable communication network, such as for example Cloud networks. Communication network 752 may include many interconnected computer systems and any suitable communication links such as hardwire links, optical links, satellite or other wireless communications links such as BLUETOOTH, WIFI, wave propagation links, or any other suitable mechanisms for communication of information. For example, communication network 752 may communicate to one or more mobile wireless devices 742A-N, such as mobile phones, tablets, and the like, via a base station such as wireless transceiver 754.

Computer 720 typically includes familiar computer components such as a processor 760, and memory storage devices, such as a memory 770, e.g., random access memory (RAM), storage media 780, and system bus 790 interconnecting the above components. In one embodiment, computer 720 is a PC compatible computer having multiple microprocessors. While a computer is shown, it will be readily apparent to one of ordinary skill in the art that many other hardware and software configurations are suitable for use with the present invention.

Memory 770 and Storage media 780 are examples of non-transitory tangible media for storage of data, audio/video files, computer programs, and the like. Other types of tangible media include disk drives, solid-state drives, floppy disks, optical storage media such as CD-ROMS and bar codes, semiconductor memories such as flash drives, flash memories, read-only-memories (ROMS), battery-backed volatile memories, networked storage devices, Cloud storage, and the like.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A client device comprising a processor operating in a system comprising one or more client devices in communication with a server system, wherein the server system executes graphical hierarchy modeling software engine, wherein the graphical hierarchy modeling software engine provides position hierarchy modeling information accessible to the client device operating in the system of the one or more client devices, the following steps executed by the client device:

receiving a data set pertaining to a position hierarchy model, wherein the data set comprises a plurality of position nodes having at least one parent position node;

traversing the data set to determine hierarchical relationships therebetween;

analyzing the plurality of position nodes to determine which position nodes are configured to receive incumbent resources, which position nodes are placeholder position nodes, and which position nodes are configured to be single resource position nodes;

receiving a plurality of incumbent resource allocations; in response to a user incumbent assignment input, assign the plurality of incumbent resource allocations to one or more of the plurality of position nodes;

in response to a user resource assignment input, assign at least one resource to at least one of the assigned incumbent resource allocations;

analyzing the data set to determine a number of open incumbent allocations remaining for the plurality of position nodes;

analyzing the data set to determine a number of resources allocated to the incumbent resource allocations;

determining from the hierarchical relationships between the plurality of position nodes a link network connecting the plurality of position nodes;

transforming the data set and link network into a graphical position hierarchy model for display to a user; and causing display of the graphical position hierarchy model;

receiving an optimization input configured to optimize at least one aspect of the graphical position hierarchy model; and in response to the optimization input, recursively varying the user incumbent assignment input until at least the one aspect of the graphical position hierarchy model is optimized to a predefined optimization threshold.

2. The client device of claim 1, further including:

analyzing the data set and link network to define one or more branches of the position hierarchy model; and in response to a change in a node position for at least one position node of the plurality of position nodes, determining which branches of the data set are affected by the change in the node position.

3. The client device of claim 2, further including:

in response to the change in the node position for the at least one position node, rerouting the link network in a manner configured to reduce rerouting changes to the position hierarchy model.

4. The client device of claim 1, further including:

in response to a change in incumbent resource allocation for one position node of the plurality of position nodes, maintaining the hierarchical relationships between the plurality of position nodes.

5. The client device of claim 1, further including determining a headcount associated with the incumbent resources allocated to the position hierarchy model.

6. The client device of claim 1, further including determining an organizational costs associated with the incumbent resources allocated to the position hierarchy model.

7. The client device of claim 1, further including determining an incumbent occupancy associated with the incumbent resources allocated to the position hierarchy model.

8. An apparatus comprising a processor for modeling position hierarchies in a computing environment, the computing environment comprising one or more computing devices in communication with a graphical hierarchy modeling software application, wherein the graphical hierarchy modeling software application executes software, wherein the software provides displayable information accessible to the one or more computing devices, a computing device of the one or more computing devices configured to:

receive a data set pertaining to a position hierarchy model, wherein the data set comprises a plurality of position nodes having at least one parent position node;

traverse the data set to determine hierarchical relationships therebetween;

analyze the plurality of position nodes to determine which position nodes are configured to receive incumbent resources, which position nodes are placeholder position nodes, and which position nodes are configured to be single resource position nodes;

receive a plurality of incumbent resource allocations;

in response to a user incumbent assignment input, assign the plurality of incumbent resource allocations to one or more of the plurality of position nodes;

in response to a user resource assignment input, assigning at least one resource to at least one of the assigned incumbent resource allocations;

analyze the data set to determine a number of open incumbent allocations remain for the plurality of position nodes;

analyze the data set to determine a number of resources allocated to the incumbent resource allocations;

determine from the hierarchical relationships between the plurality of position nodes a link network connecting the plurality of position nodes;

transform the data set and link network into a graphical position hierarchy model for display to a user;

cause display of the graphical position hierarchy model;

receive an optimization input configured to optimize at least one aspect of the graphical position hierarchy model; and in response to the optimization input, recursively varying the user incumbent assignment input until at least the one aspect of the graphical position hierarchy model is optimized to a predefined optimization threshold.

9. The apparatus of claim 8, wherein the computing device is configured to analyze the data set and link network to define one or more branches of the position hierarchy model; and in response to a change in a node position for at least one position node of the plurality of position nodes, determine which branches of the data set are affected by the change in the node position.

10. The apparatus of claim 9, wherein in response to the change in the node position for the at least one position node, the computing device is configured to reroute the link network in a manner configured to reduce rerouting changes to the position hierarchy model.

11. The apparatus of claim 8, wherein in response to a change in incumbent resource allocation for one position node of the plurality of position nodes, the computing device is configured to maintain the hierarchical relationships between the plurality of position nodes.

12. The apparatus of claim 8, wherein the computing device is configured to determine a headcount associated with the incumbent resources allocated to the position hierarchy model.

13. The apparatus of claim 8, wherein the computing device is configured to determine organizational costs associated with the incumbent resources allocated to the position hierarchy model.

14. The apparatus of claim 8, wherein the one or more computing devices are configured to determine an incumbent occupancy associated with the incumbent resources allocated to the position hierarchy model.

15. A tangible non-transitory storage medium including instructions executable by one or more servers of a server system for modeling position hierarchies in a computing environment, the computing environment including one or more computing devices in communication with a software application, wherein the software application executes software, wherein the software provides displayable information accessible to the one or more computing devices, the tangible storage medium including instructions for:

receiving a data set pertaining to a position hierarchy model, wherein the data set comprises a plurality of position nodes having at least one parent position node;

traversing the data set to determine hierarchical relationships therebetween;

analyzing the plurality of position nodes to determine which position nodes are configured to receive incumbent resources, which position nodes are placeholder position nodes, and which position nodes are configured to be single resource position nodes;

receiving a plurality of incumbent resource allocations;

in response to a user incumbent assignment input, assign the plurality of incumbent resource allocations to one or more of the plurality of position nodes;

in response to a user resource assignment input, assign at least one resource to at least one of the assigned incumbent resource allocations;

analyzing the data set to determine a number of open incumbent allocations remain for the plurality of position nodes;

analyzing the data set to determine a number of resources allocated to the incumbent resource allocations;

determining from the hierarchical relationships between the plurality of position nodes a link network connecting the plurality of position nodes;

transforming the data set and link network into a graphical position hierarchy model for display to a user;

causing display of the graphical position hierarchy model;

receiving an optimization input configured to optimize at least one aspect of the graphical position hierarchy model; and in response to the optimization input, recursively varying the user incumbent assignment input until at least the one aspect of the graphical position hierarchy model is optimized to a predefined optimization threshold.

16. The tangible non-transitory storage medium of claim 15, wherein the instructions further include:

analyzing the data set and link network to define one or more branches of the position hierarchy model; and in response to a change in a node position for at least one position node of the plurality of position nodes, determining which branches of the data set are affected by the change in the node position.

17. The tangible non-transitory storage medium of claim 16, wherein the instructions further include in response to the change in the node position for the at least one position node, rerouting the link network in a manner configured to reduce rerouting changes to the position hierarchy model.

18. The tangible non-transitory storage medium of claim 15, wherein the instructions further include, in response to a change in incumbent resource allocation for one position node of the plurality of position nodes, maintaining the hierarchical relationships between the plurality of position nodes.

19. The tangible non-transitory storage medium of claim 15, wherein the instructions further include determining a headcount associated with the incumbent resources allocated to the position hierarchy model.

20. The tangible non-transitory storage medium of claim 15, wherein the instructions further include determining organizational costs associated with the incumbent resources allocated to the position hierarchy model.

* * * * *

UNITED STATES PATENT AND TRADEMARK OFFICE
CERTIFICATE OF CORRECTION

PATENT NO. : 9,959,524 B2
APPLICATION NO. : 14/603286
DATED : May 1, 2018
INVENTOR(S) : Challenger et al.

It is certified that error appears in the above-identified patent and that said Letters Patent is hereby corrected as shown below:

In the Drawings

On sheet 9 of 10, in FIG. 6, under Reference Numeral 614, Line 1, delete "reponse" and insert -- response --, therefor.

In the Specification

In Column 1, Line 55, delete "an" and insert -- and --, therefor.

In Column 11, Line 67, delete "in crease" and insert -- increase --, therefor.

Signed and Sealed this
Sixth Day of November, 2018

Andrei Iancu
*Director of the United States Patent and Trademark Office*